US012573690B2

(12) United States Patent
Choi et al.

(10) Patent No.: US 12,573,690 B2
(45) Date of Patent: Mar. 10, 2026

(54) POUCH TYPE SECONDARY BATTERY AND METHOD FOR MANUFACTURING THE SAME

(71) Applicant: LG Energy Solution, Ltd., Seoul (KR)

(72) Inventors: Kyu Hyun Choi, Daejeon (KR); Hang June Choi, Daejeon (KR); Dal Mo Kang, Daejeon (KR); Jeong Oh Moon, Daejeon (KR); Jin Hak Kong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 708 days.

(21) Appl. No.: 17/797,828

(22) PCT Filed: Feb. 19, 2021

(86) PCT No.: PCT/KR2021/002152
§ 371 (c)(1),
(2) Date: Aug. 5, 2022

(87) PCT Pub. No.: WO2021/172819
PCT Pub. Date: Sep. 2, 2021

(65) Prior Publication Data
US 2023/0054400 A1 Feb. 23, 2023

(30) Foreign Application Priority Data
Feb. 27, 2020 (KR) ........................ 10-2020-0024613

(51) Int. Cl.
*H01M 50/105* (2021.01)
*H01M 50/166* (2021.01)
(Continued)

(52) U.S. Cl.
CPC ....... *H01M 50/105* (2021.01); *H01M 50/166* (2021.01); *H01M 50/178* (2021.01); *H01M 50/531* (2021.01)

(58) Field of Classification Search
None
See application file for complete search history.

(56) References Cited

U.S. PATENT DOCUMENTS

| | | | |
|---|---|---|---|
| 2007/0154794 A1 | 7/2007 | Kim et al. | |
| 2007/0196733 A1 | 8/2007 | Lee | |

(Continued)

FOREIGN PATENT DOCUMENTS

| | | |
|---|---|---|
| CN | 1992380 A | 7/2007 |
| CN | 105900274 A | 8/2016 |

(Continued)

OTHER PUBLICATIONS

CN107154469A machine translation (Year: 2017).*

(Continued)

*Primary Examiner* — Jonathan G Leong
*Assistant Examiner* — Aryana Y. Ortiz
(74) *Attorney, Agent, or Firm* — Lerner David LLP

(57) ABSTRACT

Disclosed herein are a pouch type secondary battery and a method for manufacturing the same. A pouch type secondary battery may include an electrode assembly having a first width and a pouch type exterior in which a recess part configured to accommodate the electrode assembly is formed. The recess part may include a main recess part and a sub recess part. The main recess part may have a space defining a second width that is equal to or greater than the first width. The sub recess part may communicate with the main recess part and define a space having a third width less than the first width.

5 Claims, 6 Drawing Sheets

(51) Int. Cl.
  *H01M 50/178*    (2021.01)
  *H01M 50/531*    (2021.01)

(56)         References Cited

U.S. PATENT DOCUMENTS

| | | | |
|---|---|---|---|
| 2007/0202398 A1 | 8/2007 | Kim | |
| 2009/0244431 A1 | 10/2009 | Shirota | |
| 2009/0258293 A1 | 10/2009 | Lee | |
| 2014/0212701 A1 | 7/2014 | Hur | |
| 2015/0303412 A1 | 10/2015 | Lee | |
| 2016/0315294 A1 | 10/2016 | Kim | |
| 2017/0207483 A1 | 7/2017 | Kim et al. | |
| 2018/0248235 A1 | 8/2018 | Kim et al. | |
| 2018/0254468 A1 | 9/2018 | Kim et al. | |
| 2019/0027714 A1* | 1/2019 | Jung | H01M 10/0436 |
| 2019/0393452 A1 | 12/2019 | Kim et al. | |
| 2020/0067029 A1 | 2/2020 | Park et al. | |
| 2020/0067034 A1 | 2/2020 | Kim et al. | |
| 2020/0185675 A1 | 6/2020 | Lee et al. | |
| 2020/0280044 A1 | 9/2020 | Park et al. | |
| 2020/0365836 A1 | 11/2020 | Jung et al. | |
| 2022/0102786 A1 | 3/2022 | Kim et al. | |
| 2022/0102790 A1 | 3/2022 | Jung et al. | |
| 2022/0109218 A1 | 4/2022 | Park et al. | |

FOREIGN PATENT DOCUMENTS

| | | | | |
|---|---|---|---|---|
| CN | 107154469 A | 9/2017 | | |
| CN | 110635069 A | 12/2019 | | |
| DE | 102018104554 A1 * | 8/2019 | ......... | H01M 50/119 |
| JP | 2001338695 A * | 12/2001 | | |
| JP | 2004281199 A | 10/2004 | | |
| JP | 20080034223 A | 2/2008 | | |
| KR | 20030034738 A | 5/2003 | | |
| KR | 20060029751 | 4/2006 | | |
| KR | 20070075941 A | 7/2007 | | |
| KR | 100890161 B1 * | 3/2009 | ......... | H01M 50/105 |
| KR | 20090038117 | 4/2009 | | |
| KR | 20090076281 A * | 7/2009 | ........... | H01M 50/55 |
| KR | 20120008297 | 1/2012 | | |
| KR | 101273472 | 6/2013 | | |
| KR | 20160106932 A | 9/2016 | | |
| KR | 20170055113 | 5/2017 | | |
| KR | 20170068730 | 6/2017 | | |
| KR | 20170069980 A | 6/2017 | | |
| KR | 20170086346 | 7/2017 | | |
| KR | 20170101650 | 9/2017 | | |
| KR | 101863703 B1 | 6/2018 | | |
| KR | 20180128756 A | 12/2018 | | |
| KR | 20190010434 A | 1/2019 | | |
| KR | 20190024755 A | 3/2019 | | |
| KR | 101972601 B1 | 4/2019 | | |
| KR | 20190042800 | 4/2019 | | |
| KR | 20190042801 | 4/2019 | | |
| KR | 20190043251 A | 4/2019 | | |
| KR | 20190106473 | 9/2019 | | |
| KR | 20200000321 A | 1/2020 | | |
| WO | WO-2018052214 A1 * | 3/2018 | ......... | H01M 50/105 |

OTHER PUBLICATIONS

KR100890161B1_Machine translation (Year: 2009).*
JP2001338695A_Machine translation (Year: 2001).*
WO2018052214A1 Machine translation (Year: 2018).*
DE102018104554A1 Machine translation (Year: 2019).*
KR20090076281A Machine translation (Year: 2009).*
Search Report dated Aug. 23, 2023 from the Office Action for Chinese Application No. 202180012460.4 issued Aug. 24, 2023, pp. 1-3.
International Search Report for Application No. PCT/KR2021/002152 mailed Jun. 9, 2021, pp. 1-3.
Communication pursuant to Article 94(3) EPC, for European Application No. 21760759. 7, dated Mar. 12, 2025, 6 pages.

* cited by examiner

1

POUCH TYPE SECONDARY BATTERY AND METHOD FOR MANUFACTURING THE SAME

CROSS-REFERENCE TO RELATED APPLICATION(S)

The present application is a national phase entry under 35 U.S.C. § 371 of International Application No. PCT/KR2021/002152 filed on Feb. 19, 2021, which claims the benefit of the priority of Korean Patent Application No. 10-2020-0024613, filed on Feb. 27, 2020, the disclosures of all of which are hereby incorporated by reference in their entirety.

TECHNICAL FIELD

The present invention relates to a pouch type secondary battery and a method for manufacturing the same.

BACKGROUND ART

Secondary batteries that are repetitively chargeable and dischargeable may be divided into prismatic type secondary batteries, cylindrical type secondary batteries, and pouch type secondary batteries according to their manufacturing methods and structures. Among them, a pouch type secondary battery is widely used because of its simple structure and high electric capacity per unit volume.

In general, the pouch type secondary battery is manufactured by pressing one area of a sheet-shaped pouch type exterior to form a cup, accommodating an electrode assembly in the cup, folding the exterior, and sealing a circumferential area of the exterior.

After folding the exterior, a folding area protruding outward is formed at a folded point. According to the related art, there is a problem that the exterior of the secondary battery is damaged because the folding area protruding outward interferes with other components in a battery module while manufacturing the battery module using the pouch type secondary batteries.

DISCLOSURE OF THE INVENTION

Technical Problem

Therefore, an object of the present invention for solving the above problem is to minimize a degree of outward protrusion of a folding area formed in a process of manufacturing a pouch type secondary battery, thereby preventing the pouch type secondary battery from interfering with other components within a battery module.

Technical Solution

According to one aspect of the present invention for achieving the above object, a pouch type secondary battery comprises: an electrode assembly having a first width (W1); and a pouch type exterior in which a recess part configured to accommodate the electrode assembly is formed, wherein the recess part comprises: a main recess part in which a space having a second width (W2) that is equal to or greater than the first width (W1) is formed; and a sub recess part which communicates with the main recess part and in which a space having a third width (W3) less than the first width (W1) is formed.

The electrode assembly may further comprise: a main body configured to form a body of the electrode assembly; and an electrode tab protruding from the main body, wherein the electrode tab has a fourth width (W4) that is equal to or less than the third width (W3), and at least a portion of the electrode tab is disposed in the sub recess part.

In a cross-section when the exterior is horizontally cut in a direction in which the electrode tab protrudes, a small angle (θ) of angles formed by the main recess part and the sub recess part on an area (R) on which the main recess part and the sub recess part meet each other may be formed as a right angle or an obtuse angle.

In a cross-section when the exterior is cut in a direction in which the electrode tab protrudes, an area (R) on which the main recess part and the sub recess part meet each other may be formed in a curved shape.

A vertical height of the main recess part and a vertical height of the sub recess part may be the same.

A length (L1) of the main body of the electrode assembly may be equal to or less than a length (L2) of the main recess part.

According to another aspect of the present invention for achieving the above object, a method for manufacturing a pouch type secondary battery comprises: a first step of preparing a pouch type exterior comprising a first area and a second area; a second step of pressing a portion of the first area to form a recess part in the first area; a third step of accommodating an electrode assembly having a first width (W1) in the recess part; a fourth step of folding the second area with respect to the first area so that the first area and the second area face each other; a fifth step of pulling the second area toward an end opposite to the area on which the second area is folded area with respect to the first area; and a sixth step of bonding at least a portion of a circumferential area of the first area to at least a portion of a circumferential area of the second area to form a sealing part, wherein the recess part formed in the first area in the second step comprises: a main recess part in which a space having a second width (W2) that is equal to or greater than a first width (W1) is formed; and a sub recess part which communicates with the main recess part and in which a space having a third width (W3) less than the first width (W1) is formed.

In the fifth step, an opposite end of an area of the second area, which is folded with respect to the first area may be pulled.

An electrode lead may protrude outward from the pouch type exterior, and in the fifth step, the second area may be pulled in a direction perpendicular to a direction in which the electrode lead protrudes.

The electrode assembly may comprise an electrode tab protruding from the electrode assembly and connected to the electrode lead, the electrode tab may have a fourth width (W4) that is equal to or less than the third width (W3), and in the third step, at least a portion of the electrode tab may be disposed in the sub recess part.

In the second step, a vertical height of the main recess part and a vertical height of the sub recess part may be the same.

Advantageous Effects

According to the present invention, the degree of outward protrusion of the folding area formed in the process of manufacturing the pouch type secondary battery may be minimized to prevent the pouch type secondary battery from interfering with other components within the battery module.

MODE FOR CARRYING OUT THE INVENTION

Figure 1:
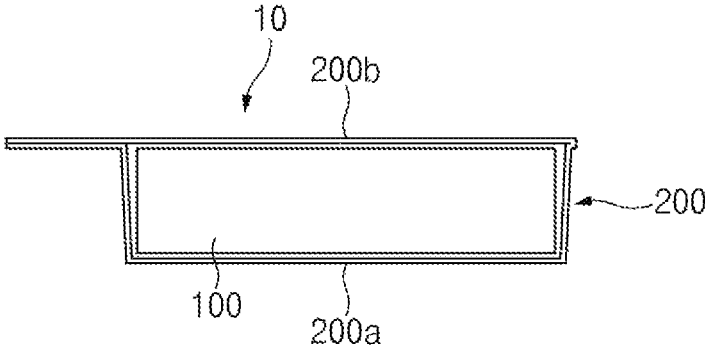
FIG. 1 is a vertical cross-sectional view of a pouch type secondary battery according to the present invention.
Figure 2:
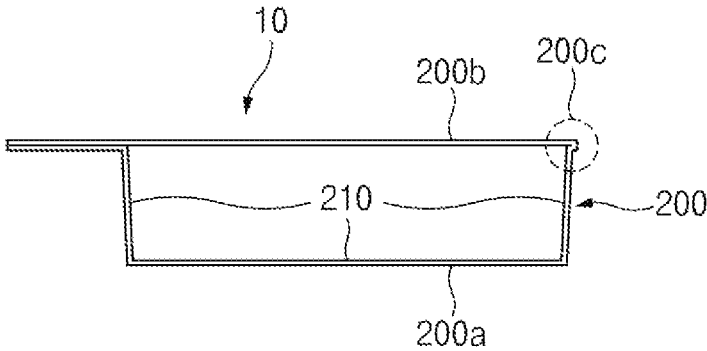
FIG. 2 is a vertical cross-sectional view of an exterior of the pouch type secondary battery of FIG. 1.

Hereinafter, a pouch type secondary battery and a method for manufacturing the pouch type secondary battery according to the present invention will be described with reference to the drawings.
Pouch Type Secondary Battery FIG. 1 is a vertical cross-sectional view illustrating a structure of a pouch type secondary battery according to the present invention, and FIG. 2 is a vertical cross-sectional view illustrating a structure of an exterior of the pouch type secondary battery according to the present invention. Also, FIG. 3 is a horizontal cross-sectional view illustrating the structure of the pouch type secondary battery according to the present invention.

Figure 3:
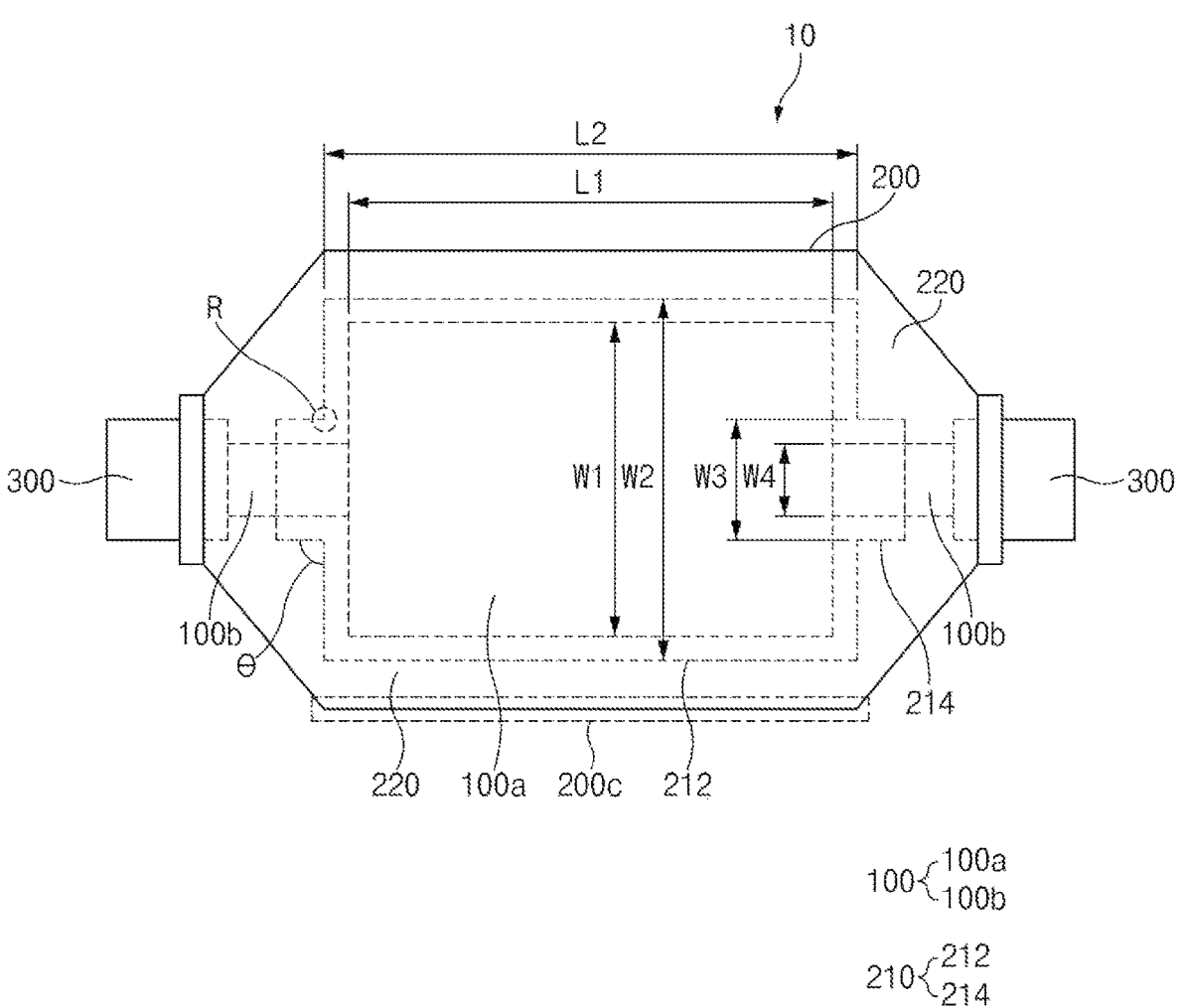
FIG. 3 is a horizontal cross-sectional view of the pouch type secondary battery of FIG. 1.

As illustrated in FIGS. 1 and 3, a pouch type secondary battery 10 (hereinafter, referred to as a 'secondary battery') according to the present invention may comprise an electrode assembly 100. The electrode assembly 100 may have a structure in which electrodes and separators are alternately disposed in a thickness direction of the electrode assembly.

The electrode assembly 100 may comprise a main body 100a forming a body of the electrode assembly and an electrode tab 110 protruding from the main body 100a. As illustrated in FIG. 3, the electrode tab 100b may protrude in both directions of the electrode assembly 100. Here, the electrode tab protruding in one direction (for example, a left direction of the electrode assembly 100 in FIG. 3) of the electrode assembly 100 may be a positive electrode tab, and the electrode tab protruding in the other direction (for example, a right direction of the electrode assembly in FIG. 3) of the electrode assembly 100 may be a negative electrode tab.

The electrode assembly 100 may have a predetermined width and length. In this specification, the length of the electrode assembly 100 may be defined as a size of the electrode assembly 100 formed along a direction parallel to the direction in which the electrode tab 10b protrudes, and the width of the electrode assembly 100 may be defined as a size of the electrode assembly 100 formed along a direction perpendicular to the longitudinal direction of the electrode assembly.

According to the above definition, the electrode assembly 100 may have a first width W1 in a direction perpendicular to the direction in which the electrode tab 100b protrudes.

As illustrated in FIGS. 1 to 3, a secondary battery 10 according to the present invention may further comprise a pouch type exterior 200 (hereinafter, referred to as an 'exterior') that accommodates the electrode assembly 100. Here, a recess part 210 that accommodates the electrode assembly 100 may be formed in the exterior 200. The recess part 210 of the exterior 200 may have a shape that is recessed in one direction compared to other areas of the exterior. FIG. 2 illustrates a shape in which the recess part 210 is further recessed downward than other areas of the exterior 200.

In this specification, similar to a case of the electrode assembly, a length of each of the exterior 200 and the recess part 210 may be defined as a size of each of the exterior 200 and the recess part 210 formed along a direction parallel to the direction in which the electrode tab 100b protrudes, and a width of each of the exterior 200 and the recess part 210 may be defined as a size of each of the exterior 200 and the recess part 210 formed along a direction perpendicular to the longitudinal direction of each of the exterior 200 and the recess part 210.

Also, as illustrated in FIGS. 1 and 2, the exterior 200 may comprise a first area 200a and a second area 200b. Here, the first area 200a and the second area 200b may be in contact with each other, and the second area 200b may be folded with respect to the first area 200a by using a folding area 200c, which is a boundary between the first area 200a and the second area 200b, as an axis.

As illustrated in FIGS. 1 and 2, the recess part 210 may be formed only in the first area 200a of the exterior 200. However, unlike this, the recess part 210 may be formed in the first area 200a and the second area 200b of the exterior.

As illustrated in FIG. 3, a sealing part 220 formed by bonding a circumferential area of the first area 200a of the exterior 200 to a circumferential area of the second area 200b of the exterior 200 may be formed around the recess part 210 comprising a main recess part 212 and a sub recess part 214.

Also, as illustrated in FIG. 3, the secondary battery 10 according to the present invention may further comprise an electrode lead 300 protruding outward from the exterior 200. The electrode lead 300 may be electrically connected to the electrode assembly 100 by being connected to the electrode tab 100b. Similar to the electrode tab, the electrode lead 300 may also protrude in both directions of the exterior 200. Here, the electrode tab protruding in one direction (for example, a left direction of the exterior 200 in FIG. 3) of the exterior 200 may be a positive electrode lead, and the electrode lead protruding in the other direction (for example, a right direction of the exterior 200 in FIG. 3) of the exterior 200 may be a negative electrode lead. Also, the electrode lead 300 may protrude outward from the inside of the exterior 200 through the sealing part 220.

As illustrated in FIG. 3, the recess part 210 may comprise a main recess part 212 in which a space having a second width W2 that is equal to or greater than a first width W1, which is a width of the electrode assembly 100, is formed and a sub recess part 214 which communicates with the main recess part 212 and in which a space having a third width W3 less than the first width W1 is formed. Here, the main body 100a of the electrode assembly 100 may be disposed in the main recess part 212.

Also, according to the present invention, the fourth width W4, which is the width of the electrode tab 100b, may have a width that is equal to the third width W3, which is the width of the sub recess part 214, or less than the third width W3. Also, at least a portion of the electrode tab 100b may be disposed in the sub recess part 214.

As described above, according to the present invention, the recess part 210 formed in the exterior 200 may comprise the main recess part 212 and the sub recess part 214, which have widths different from each other, and the main body 100a and the electrode tab 100b of the electrode assembly 100 may be disposed in the main recess part 212 and the sub recess part 214, respectively. Here, since the width W3 of the sub recess part 214 is less than the width W1 of the electrode assembly 100, the main body 100*a* of the electrode assembly 100 may be prevented from being inserted into the space formed by the sub recess part 214. Thus, even if the electrode assembly 100 moves due to external force in the process of manufacturing the secondary battery or the process of using the secondary battery, the main body 100*a* of the electrode assembly 100 may be prevented from being separated from the main recess part 212.

Continuously, referring to FIG. 3, an area R on which the main recess part 212 and the sub recess part 214 meet each other may be formed in a cross-section when the exterior 200 is horizontally cut in the direction in which the electrode tab 100*b* protrudes. Here, the area Ron which the main recess part 212 and the sub recess part 214 meet each other may be formed in a curved shape.

When the electrode assembly 100 moves in the process of manufacturing the secondary battery or the process of using the secondary battery, the main body 100*a* of the electrode assembly 100 may be in contact with the area R on which the main recess part 212 and the sub recess part 214 meet each other. In this case, when the area R is formed sharply, the main body 100*a* of the electrode assembly 100 may be damaged.

On the other hand, when the area R is formed in the curved shape as in the present invention, even though the main body 100*a* of the electrode assembly 100 is in contact with the area R, the main body 100*a* may be maintained in its original state without being damaged.

Also, continuously, referring to FIG. 3, in the cross-section when the exterior 200 is horizontally cut in the direction in which the electrode tab 100*b* protrudes, a small angle θ of angles formed by the main recess part 212 and the sub recess part 214 on the area R on which the main recess part 212 and the sub recess part 214 meet each other may be formed as a right angle or an obtuse angle.

For example, when a small angle of the angles formed by the main recess part 212 and the sub recess part 214 is formed as an acute angle, the area R on which the main recess part 212 and the sub recess part 214 meet each other may protrude toward the main body 100*a* of the electrode assembly 100. In this case, when the area R and the main body 100*a* are in contact with each other, the main body 100*a* may be damaged.

On the other hand, as in the present invention, when the small angle θ of the angles formed by the main recess part 212 and the sub recess part 214 is formed as the right angle or the obtuse angle, the main body 100*a* may be maintained in its original state without being damaged by the area R.

According to the present invention, a vertical height of the main recess part 212 and a vertical height of the sub recess part 214 may be the same. In this case, when compared to the case in which the vertical height of the sub recess part 214 in which the electrode tab 100*b* is disposed is less than the vertical height of the main recess part 212, since a more amount of electrolyte is accommodated in an inner space of the exterior 200, the electrode assembly 100 may be more smoothly exhibited in performance.

Referring to FIG. 3, the main body 100*a* of the electrode assembly 100 may have a length L1 that is equal to or less than a length L2 of the main recess part 212 so that the electrode assembly 100 is smoothly accommodated in the recess part 210.

Method for Manufacturing Pouch Type Secondary Battery

Figure 4:
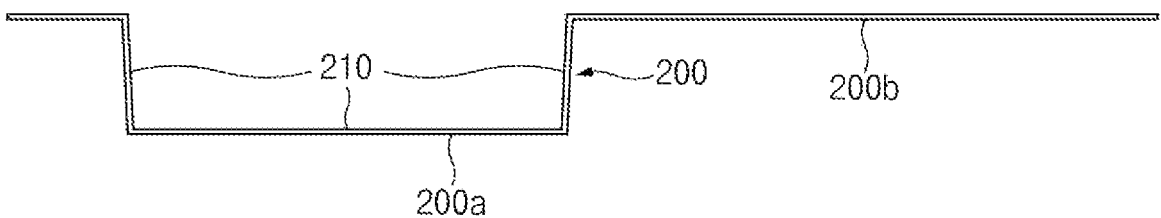
FIG. 4 is a vertical cross-sectional view of a recess part in an exterior according to a method for manufacturing a pouch type secondary battery of the present invention.
Figure 5:
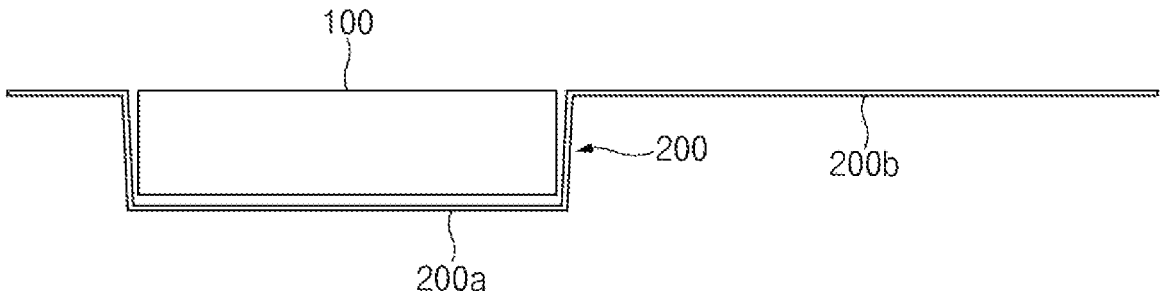
FIG. 5 is a vertical cross-sectional view illustrating an electrode assembly in the recess part of the exterior according to a method for manufacturing the pouch type secondary battery of the present invention.
Figure 6:
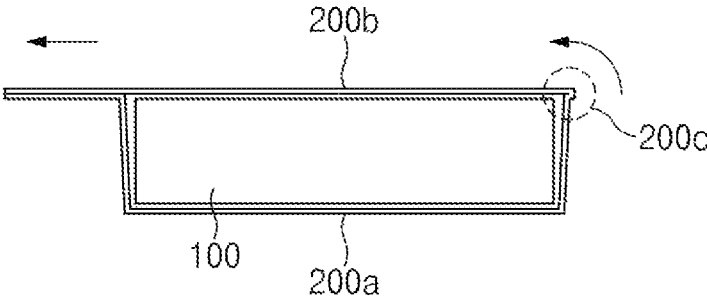
FIG. 6 is a vertical cross-sectional view illustrating a shape of a second area of the exterior according to a method for manufacturing the pouch type secondary battery of the present invention.

FIG. 4 is a vertical cross-sectional view illustrating a shape in which a recess part is formed in an exterior in a method for manufacturing a pouch type secondary battery according to the present invention, and FIG. 5 is a vertical cross-sectional view illustrating a shape in which an electrode assembly is accommodated in the recess part of the exterior in the method for manufacturing the pouch type secondary battery according to the present invention. FIG. 6 is a vertical cross-sectional view illustrating a shape in which a second area of the exterior is folded and a shape in which the second area is pulled in one direction in the method for manufacturing the pouch type secondary battery according to the present invention.

As illustrated in FIG. 4, a method for manufacturing a secondary battery according to the present invention may comprise a first step of preparing a pouch type exterior 200 comprising a first area 200*a* and a second area 200*b* and a second step of pressing a portion of the first area 200*a* to form a recess part 210 in the first area 200*a*.

Also, as illustrated in FIG. 5, the method for manufacturing the secondary battery according to the present invention may further comprise a third step of accommodating an electrode assembly 100 having a first width W1 (see FIG. 3) in the recess part 210. As illustrated in FIG. 6, the method for manufacturing the secondary battery according to the present invention may further comprise a fourth step of folding the second area 200*b* with respect to the first area 200*a* so that the first area 200*a* and the second area 20*b* face each other. Thus, in the fourth step, a folding area 200*c* comprising an axis that rotates so that the second area 200*b* is folded with respect to the first area 200*a* may be formed on a boundary between the first area 200*a* and the second area 200*b*.

Also, as illustrated in FIG. 6, the method for manufacturing the secondary battery according to the present invention may further comprise a fifth step of pulling the second area 200*b* toward an end opposite to the area (i.e., the folding area 200*c*) on which the second area 200*b* is folded area with respect to the first area 200*a*. Here, the fifth step may be performed simultaneously with the fourth step or may be performed after the fourth step is completed.

According to the present invention, since the second area is pulled toward the end that is opposite to the folding area 200*c* during the folding of the exterior 200 or after the folding, a degree of outward protruding of the folding area 200*c* may be significantly reduced. Therefore, when compared to the related art, it is possible to prevent the pouch type secondary battery from interfering with other components constituting the battery module or the like.

More preferably, in the fifth step, the opposite end of the area (i.e., the folding area 200*c*) of the second area 200*b*, which is folded with respect to the first area 200*a* may be pulled.

Also, the method for manufacturing the secondary battery according to the present invention may further comprise a sixth step of bonding at least a portion of a circumferential area of the first area 200*a* to at least a portion of a circumferential area of the second area 200*b* to form a sealing part 220.

Here, the recess part 210 formed in the first area 200*a* of the exterior 200 in the second step may comprise a main recess part 212 in which a space having a second width W2 that is equal to or greater than a first width W1 of the electrode assembly 100 is formed and a sub recess part 214 which communicates with the main recess part 212 and in which a space having a third width W3 less than the first width W1 is formed.

Referring to FIG. 3, the secondary battery 10 manufactured by the method for manufacturing the secondary battery according to the present invention may comprise an electrode lead 300 protruding outward from the exterior 200. Here, according to the present invention, in the fifth step, the second area 200*b* may be pulled in a direction perpendicular to a direction in which the electrode lead 300 protrudes.

Also, the electrode assembly 100 provided in the secondary battery 10 manufactured by the method for manufacturing the secondary battery according to the present invention may comprise an electrode tab 100*b* protruding from the electrode assembly and connected to the electrode lead 300. Here, the electrode tab 100*b* may have a fourth width W4 that is equal to or less than the third width W3, which is the width of the sub recess part 214. According to the present invention, in the third step, at least a portion of the electrode tab 100*b* may be disposed in the sub recess part 214.

According to the present invention, since an electrolyte is sufficiently accommodated in an inner space of the exterior 200, in the second step, a vertical height of the main recess part 212 and a vertical height of the sub recess part 214 may be the same so that performance of the electrode assembly 100 is smoothly exhibited.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Secondary battery
100: Electrode assembly
100*a*: Main body
100*b*: Electrode tab
200: Exterior
200*a*: First area
200*b*: Second area
200*c*: Folding area
210: Recess part
212: Main recess part
214: Sub recess part
220: Sealing part
300: Electrode lead
W1: Width of electrode assembly
W2: Width of main recess part
W3: Width of sub recess part
W4: Width of electrode tab
R: area on which main recess part and sub recess part meet each other
θ: Small angle of angles formed by main recess part and sub recess part

The invention claimed is:

1. A method for manufacturing a pouch type secondary battery, the method comprising:

preparing a pouch type exterior comprising a first area and a second area;

pressing a portion of the first area to form a recess part in the first area;

accommodating an electrode assembly having a first width in the recess part;

rotating the second area about an axis of a folding area to fold the second area with respect to the first area such that the first area and the second area face each other and a protruding area of the folding area extending outward is formed;

pulling the second area toward an end opposite to the folding area to reduce the outward extension of the protruding area of the folding area; and bonding at least a portion of a circumferential area of the first area to at least a portion of a circumferential area of the second area to form a sealing part, wherein the recess part includes a main recess part and a sub recess part, the main recess part including a space having a second width equal to or greater than a first width, the sub recess part being in communication with the main recess part and defining a space having a third width less than the first width.

2. The method of claim 1, wherein the step of pulling the second area toward an end opposite to the folding area includes a step of pulling an end of an area of the second area opposite the folding area.

3. The method of claim 1, wherein the step of pulling the second area toward an opposite end of the folding area includes a step of pulling the second area in a direction perpendicular to a direction of an electrode lead protruding from the pouch type exterior.

4. The method of claim 3, wherein the electrode assembly comprises an electrode tab protruding from the electrode assembly and connected to the electrode lead, the electrode tab defining a fourth width equal to or less than the third width, in the third-step of accommodating the electrode assembly, at least a portion of the electrode tab being disposed in the sub recess part.

5. The method of claim 4, wherein the step of pressing a portion of the first area to form the recess part includes a step of forming a vertical height of the main recess part and a vertical height of the sub recess part to be equal.

* * * * *